(12) United States Patent
Nemmaier et al.

(10) Patent No.: US 7,924,446 B2
(45) Date of Patent: Apr. 12, 2011

(54) METHOD AND DEVICE FOR HANDLING ERRORS IN A PRINTER OR COPIER

(75) Inventors: Christoph Nemmaier, München (DE); Peter Bremmer, Röhrmoos (DE); Hubert Drexler, Taufkirchen (DE)

(73) Assignee: Oce Printing Systems GmbH, Poing (DE)

( * ) Notice: Subject to any disclaimer, the term of this patent is extended or adjusted under 35 U.S.C. 154(b) by 893 days.

(21) Appl. No.: 10/521,688

(22) PCT Filed: Jul. 17, 2003

(86) PCT No.: PCT/EP03/07803
§ 371 (c)(1),
(2), (4) Date: Aug. 10, 2005

(87) PCT Pub. No.: WO2004/009363
PCT Pub. Date: Jan. 29, 2004

(65) Prior Publication Data
US 2006/0153613 A1    Jul. 13, 2006

(30) Foreign Application Priority Data
Jul. 18, 2002    (DE) .................................. 102 32 631

(51) Int. Cl.
*G06K 15/00* (2006.01)
*G06F 11/00* (2006.01)
(52) U.S. Cl. ............. 358/1.14; 714/26; 714/27; 714/44
(58) Field of Classification Search .................. 358/1.1, 358/1.14
See application file for complete search history.

(56) References Cited

U.S. PATENT DOCUMENTS

| 5,467,449 | A | 11/1995 | Gauronski et al. |
| 6,185,379 | B1 | 2/2001 | Lay et al. |
| 6,598,179 | B1 * | 7/2003 | Chirashnya et al. ............. 714/37 |
| 6,629,060 | B2 * | 9/2003 | Okuno et al. .................. 702/187 |
| 6,665,088 | B1 * | 12/2003 | Chiba et al. ................... 358/1.17 |
| 6,666,594 | B2 * | 12/2003 | Parry ............................... 400/74 |
| 6,782,495 | B2 * | 8/2004 | Bernklau-Halvor ............ 714/44 |
| 2002/0098027 | A1 * | 7/2002 | Koike et al. ..................... 400/62 |
| 2003/0105995 | A1 * | 6/2003 | Schroath et al. ................ 714/48 |

FOREIGN PATENT DOCUMENTS

| DE | 691 25 677 | 11/1997 |
| JP | 63-59622 | 3/1988 |
| JP | 63-186325 | 8/1988 |
| JP | 4-314573 | 11/1992 |
| JP | 7-81187 | 3/1995 |
| JP | 11-164116 | 6/1999 |
| JP | 2002139807 | 5/2002 |

* cited by examiner

*Primary Examiner* — Mark K Zimmerman
*Assistant Examiner* — Ming Hon
(74) *Attorney, Agent, or Firm* — Schiff Hardin LLP

(57) ABSTRACT

A method is provided for error handling in a printer or copier. A plurality of monitoring units detect error states of the printer or copier. A detected error states are transmitted to a controller. A plurality of successively transmitted error states are stored in a storage. The stored error states are evaluated by the controller. The stored error states are compared with predetermined error patterns and at least one error type is determined. Further steps are executed by the controller dependent on the error type.

12 Claims, 2 Drawing Sheets

METHOD AND DEVICE FOR HANDLING ERRORS IN A PRINTER OR COPIER

BACKGROUND

The disclosure concerns a method and a device for error handling in a printer or copier. Occurring error states are transferred to a controller.

In modularly designed printer and copier systems, a plurality of modules are often affected by occurring errors. Each of these modules then generates an error message independent of the other modules and transmits this to a central controller of the printer or copier system. If the printer or copier system is connected with a central host system, for example a print spooler, these error messages are output both to the host system and to the printer or copier system itself, for example to a display unit of the printer or copier system. Multiple messages are thereby output to the host system and to a control panel or a control console of the printer or copier system that hamper the detection of the causative error, for example for an operating personnel, due to the multitude and unclearness of the of the error messages. The host system can, for example, also react to a plurality of these error messages, whereby further problems can be created such as, for example, a multiple continuation of the interrupted printer or copier job, whereby print images still to be printed are doubly generated. An error protocol that is typically maintained in the printer or copier system, for example as a log file, also generally contains all of these error messages, whereby the evaluation of this log file after a recording over a longer period of time is nearly impossible. The multitude of these error messages also hampers a reaction to the automatic error correction by the printer or copier system.

In known printer or copier systems, messages of occurring errors have been output directly via a control console and have simultaneously been transferred to a host system. The evaluation of the errors has generally been ceded to the operating personnel.

The individual modules transmit error messages in the temporal sequence of the detection. It is thus difficult for an operating personnel to decide which errors are causative and which are consecutive faults. Thus, for example, a paper jam of a single page in the printer or copier system is first detected when, for example, a single page does not reach a light barrier. Depending on the light barrier separation and paper speed, to some extent a plurality of seconds pass until the detection of the error. Consequent errors, for example in the region of the printing group, sometimes occur before the light barrier notices the paper jam. The consequent error in the region of the printing group is thereby reported before the error of the paper jam.

If an error message is transmitted to the host system, an intervention of the operating personnel is necessary both at the host system and at the printer or copier system in order to continue the printer or copier process. This is also necessary when the error state no longer exists or the printer or copier system has itself remedied the error state and only a confirmation handling of the operating personnel is necessary at the host system and at the printer or copier system.

From the patent document U.S. Pat. No. 6,185,379 B1 by the applicant, a method is known for operation of a high-capacity printer with support given error states. The error states detected by monitoring units are divided into at least two error classes. The access to special information, at least given error states of the second error class, occurs via an access authorization procedure. Support is given both to the operating personnel in the correction of simple errors and to qualified technicians in the correction of major or complicated error causes to be remedied. The content of U.S. Pat. No. 6,185,379 B1 is herewith incorporated by reference into the present specification. However, a support upon determination of the error cause when a plurality of monitoring units determine successive error states is not known from U.S. Pat. No. 6,185,379 B1.

A method and a device to correct errors in an electronic reproduction system are known from the document DE 691 25 677 T2. At least one error is detected during the normal operating module. This error is subsequently grouped into at least one error group, whereby a set of particular correction and reproduction instructions is associated with the error group.

A method for error handling in a printer or copier is known from U.S. Pat. No. 6,185,379 B1. Given an occurred error, it is checked whether this is to be immediately remedied by an operating personnel or whether a specialized technician is necessary for correction.

SUMMARY

It is an object to specify a method and a device for error handling in a printer or copier in which a simple error handling in a printer or copier is possible and necessary interventions of the operating reduced.

A method is provided for error handling in a printer or copier. A plurality of monitoring units detect error states of the printer or copier. A detected error states are transmitted to a controller. A plurality of successively transmitted error states are stored in a storage. The stored error states are evaluated by the controller. The stored error states are compared with predetermined error patterns and at least one error type is determined. Further steps are executed by the controller dependent on the error type.

DESCRIPTION OF THE PREFERRED EMBODIMENT

Figure 1:
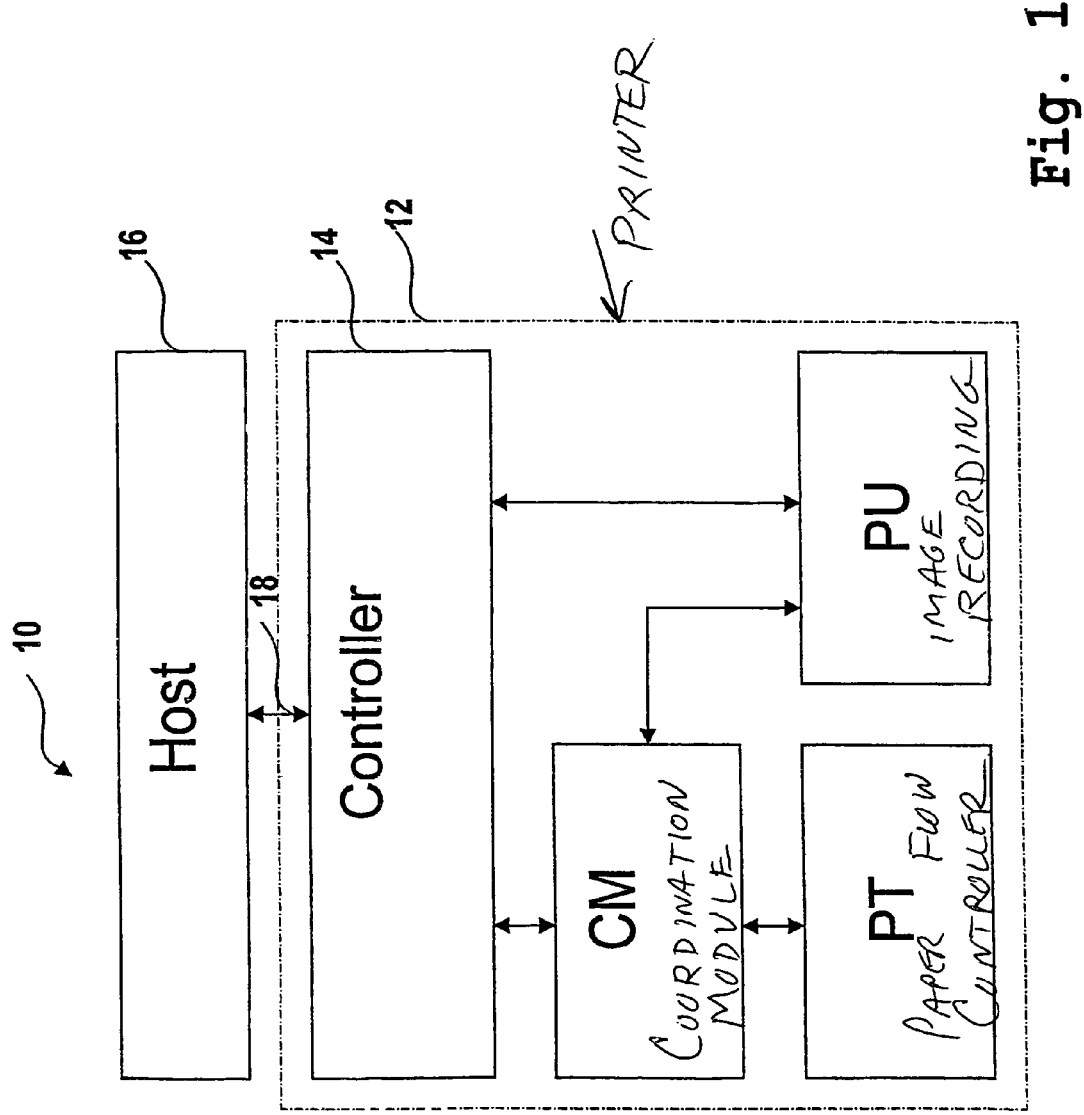
FIG. 1 is a block diagram of a system for error correction in a printer or copier.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

Occurring error states are transmitted to a controller. A plurality of error states transmitted in succession are stored in a storage. The stored error states are evaluated by the controller, whereby the controller compares the stored error states with predetermined error patterns. The controller thereby determines at least one error type. Further steps are executed by the controller dependent on the error type.

It is thereby achieved that the occurred error states can be evaluated and only error messages relevant for the causative error are output, dependent on the determined error type. An operating personnel thereby no longer has to determine the causative error from a plurality of displayed error messages. Via the determination of at least the error type, the controller can automatically initiate further steps such as, for example, the transmission of an error message to a superordinate host system or the automatic continuation of the printing process after automatic correction of the cause of the error. In particular with the aid of preset error patterns, an exact evaluation of the error cause by the controller can occur. Error causes via which error states occur, for example in a plurality of modules of the printer or copier, can thereby be simply determined. The occurring error states are communicated to the controller that simply determines from them (as already described) the error type, preferably the error cause.

According to a second aspect, a device for error correction in a printer or copier is specified. This device has a controller. Error states occurring in the printer or copier are transmitted to the controller. Furthermore, the device has a storage in which a plurality of error states transmitted in succession can be stored. The controller compares the stored error states with predetermined error patterns and determines at least one error type. The controller implements further measures dependent on the error type.

It is thereby achieved that the error cause is determined simply and quickly, in particular via the comparison with the error patterns, without interventions of an operating personnel being necessary. Only an error message on a display unit that informs the operating personnel about the error cause is output to the operating personnel. In contrast to the prior art, the operating personnel must thus no longer himself laboriously determine the relevant error message about the error type from a plurality of error messages that have been transmitted due to error states in connection with the original error. Via an evaluation of the error states with the aid of the controller, it can furthermore be achieved that the printing process is automatically restarted or an error message is transmitted to a superordinate controller such as, for example, a host system. Via the output of the error type, the operating personnel is precisely informed about the error cause, whereby the operating personnel can specifically correct the error cause with an automatic restarting of the printer or copier via automatic correction of an error and via automatic continuation of the print job interrupted by the error. This continuation is designated as a restarting or resetting of the print job.

A block diagram of a system 10 for error handling in a printer 12 is shown in FIG. 1. The printer 12 contains a controller 14 that, for example, is connected with a host computer 16 via a local network 18 (LAN-Local Area Network). The host computer 16 transfers print data to the controller 14 of the printer 12. The controller 14 transfers status messages and error messages to the host computer 16. The host computer 16 prepares print jobs and controls the sequence of the print jobs to be executed. The host computer 16 also controls a continuation of a print job after an error from a start point to be determined within the print job, after the printer 12 transmits the page number of the last page printed without error to the host computer. Alternatively, the amount of the data quantity correctly processed from the current print job up to the occurrence of the error can be transmitted to the host computer 16. A compensation of the execution status thus generally occurs between the controller 14 of the printer 12 and the host computer 16. The host computer 16 then again transmits the print data for printing of the still unprinted pages to the printer 12.

The controller 14 prepares the print data transmitted by the host computer 16 and generates from these print data, for example, raster images of the print images to be printed. The printer 12 furthermore comprises a coordination module CM, a paper flow controller PT (paper trace) and an image recording unit PU (picture unit).

The coordination module CM registers individual pages to be printed in the paper flow controller PT and also coordinates the progression of the transport of the individual pages in the printer 12 with the image recording on the individual page between the paper flow controller PT, the image recording unit PU and the controller 14. The paper flow controller 14 and the image recording unit PU transmit error messages to the communication module CM. The coordination module CM collects the transmitted error messages and implements an evaluation of these error messages. Furthermore, further monitoring units (not shown) transmit error messages given occurring errors. The monitoring units are contained in a plurality of device components (not shown) such as, for example, a paper input unit, a paper output unit, a stack unit etc. The signal and data exchange between the individual controller modules 14, CM and the individual device units PT, PU of the printer 12 preferably occurs with the aid of a bus system.

The paper flow controller PT controls the transport of the individual pages through the printer 12 and generates messages to the coordination module CM about the correct depositing of the individual pages in a depositing tray or a stack unit. Furthermore, given an occurring paper flow error the paper flow controller PT generates one or more detailed error messages that are transmitted to the coordination module CM. The image recording unit PU is connected via the bus system with the controller 14, whereby the image recording unit PU requests pixel data from the controller 14, whereupon the controller 14 transfers these pixel data to the image recording unit PU for the generation of the print image. The image recording unit PU also generates a print image from these pixel data and transfer-prints this on the side of a single page to be printed.

The coordinate module CM transfers position information of the individual pages to be printed to the image recording unit PU. The coordinate module CM registers individual pages to be printed in the image recording unit PU. In addition to error states of the printing unit, the image recording unit PU furthermore determines association errors that occur when the print image to be generated from the currently present pixel diagnosis and/or therapy should be generated on a different page than that supplied to the printing unit. The image recording unit PU transfers page information of the individual page to be printed or the printed individual page to the coordinate module CM as well as occurring error messages. The coordinate module CM furthermore transfers to the image recording unit PU position information of the individual page to be printed that the coordination module CM has previously obtained from the paper flow controller PT.

The controller 14 furthermore comprises counters such as individual page counters, operating hour counters as well as page- and time-independent wear counters. An error storage, in which error statistics and operation states are stored and protocolled in the temporal sequence of their occurrence, is also contained in the controller 14.

Figure 2:
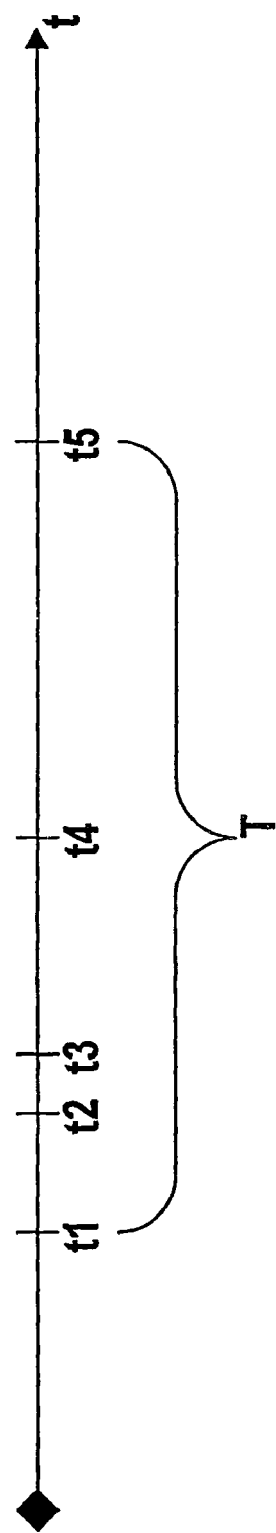
FIG. 2 shows the time sequence of error messages arriving after an error.

In FIG. 2, the error messages of individual monitoring units (such as, for example, the paper flow controller PT) transmitted to the coordination module CM after the occurrence of an error are shown in their temporal sequence. A paper flow error such as, for example, a paper jam occurs in the printer 12 at the point in time t1. An image recording error subsequently occurs at the point in time t2, since the individual page causing the paper jam did not arrive at the printing group at a predetermined point in time.

The image recording unit PU detects the recording error and transmits an error message to the coordination module CM at the point in time t3. The paper flow controller PT first detects the paper flow error when the individual page does not reach a light barrier after the printing group at a predetermined point in time. This is detected by the paper flow controller PT at the point in time t4, after the individual page has not reached the light barrier in time. A corresponding error message is transmitted from the paper flow controller PT to the coordination module CM. The coordination module CM evaluates the error and determines at least one error type.

The coordination module CM thereby preferably determines the causative error and executes further steps dependent on the error type. In the exemplary embodiment according to FIG. 2, the printing process is interrupted and the printer 12 is halted. Undamaged, correctly printed pages present in the printer 12 that had already passed the error location at the point in time of the occurrence of the error are still output before the shutdown of the printer 12.

At the point in time t5, all undamaged individual pages still present in the printer 12 are output and the printing event is interrupted. At this point in time t5, all error states determined by the monitoring units (PU, PT) of the printer 12 in connection with the error are transmitted to the coordination module CM and stored. The time span between the occurrence of the first error at the point in time t1 until the shutdown of the printer 12 at the point in time t5 is specified with T in FIG. 2. The error states transmitted in the time span T are evaluated by the coordination module CM, whereby they are stored and compared with predetermined error patterns. A causative error is thereby preferably determined. The error patterns contain one or more error states, whereby given a plurality of error states the sequence of their occurrence and/or the sequence of their notification to the controller 14 is also taken into account.

In the present exemplary embodiment, a recording error is registered at the coordination module CM at the point in time t3 and a paper flow error is registered at the coordination module CM at the point in time t4. This error pattern indicates that the first registered recording error is a consequent error of the subsequently registered paper flow error. The coordination module CM thus determines the paper flow error using a stored error pattern as a causative error and registers this to the controller 14. The controller 14 thereupon initiates the error correction, in that it starts a routine to remove paper residues from the paper path and subsequently implements a self-test.

If the self-test is successful, the printer 12 is automatically restarted. If the routing for the removal of paper from the paper path is not executed properly or if the self-test is unsuccessful, the controller 14 gives an error message to the superordinate host computer 16. The host computer 16 thereupon stops the print jobs for the printer 12. An intervention of an operating personnel for resumption of the operation of the printer 12 and for continuation of an interrupted print job with the first page of the original print job not printed error-free by the host computer system 16 are only necessary in this case. Given the automatic resumption of the operation after an automatic correction of the paper flow error by the printer 12, no error message occurs on the host system 16. Only an entry of the original error, meaning the paper flow error, occurs in the error protocol of the printer 12, as well as a display of an error message on a display unit of the printer 12 via which the operating personnel is informed about the occurred error.

The automatic correction of the paper flow error can, for example, occur via the output of a damaged single page that has caused the paper flow error. Other error causes can be automatically corrected again after the shutdown of the printer 12 or already corrected given shutdown of the printer 12. For example, an error in toner shortage in the developer station as a consequence of a high toner consumption is automatically remedied after the back-transport of toner, at the latest after a short shutdown time of the printer 12. Errors in the voltage supply of assemblies, in particular via voltage fluctuations in the supply voltage or an interruption of the voltage supply of individual assemblies via overload release can, after a short wait time without operator action, at least be corrected such that a further operation of the printer 12 is possible.

In another exemplary embodiment, given evaluation of the error states an error group is selected, whereby further steps can be established dependent on the selected error group, the determined error type and/or the causative error. Thus, for example dependent on the error group, as in the patent document U.S. Pat. No. 6,185,379 B1 of the applicant, dependent on the determined error class, support can be given to remedy the occurred error, for example via display of corresponding text messages or video sequences on the display unit of the printer 12. The access to special information given error states can thereby occur via an access authorization procedure.

In other exemplary embodiments, the type and/or the sequence of the occurred error states is considered upon comparison of the stored error states with the predetermined error patterns. The causative errors can thereby be determined very precisely and targeted measures for error correction can be implemented quickly. In other embodiments, after an error state the print jobs can be continued at the point at which the error occurred, whereby the current print job to be executed is continued without interruption and without overlap. The print job is thus continued with the page that, in the print job, follows the last page printed without error before the occurrence of the error.

The printer 12 is preferably a high-capacity printer with a printing speed of greater than or equal to 50 page A4 per minute. Due the relatively complicated design of such a high-capacity printer 12, the error handling described herein is particularly advantageous and appropriate.

Although preferred exemplary embodiments have been shown and specified in detail in the drawings and in the preceding specification, this should be viewed as purely exemplary and not as limiting the invention. It is to be noted that only preferred exemplary embodiments are shown and specified, and all changes and modifications that presently and in the future lie within the protective scope of the invention should be protected.

We claim as our invention:

1. A method for error handling in a printer or copier, comprising the steps of:
 providing a plurality of separate monitoring units each located in a different device component of the printer or copier, each monitoring unit detecting a respective error state at a respective time point represented by a respective error signal from said respective monitoring unit of the printer or copier created by a single causative error;
 transmitting the detected error states and the respective time points to a coordination module which receives them;
 storing said received error states and the respective time points at a storage associated with said coordination module where combined they form a temporally successive error state pattern comprising said error states and the respective time points caused by said single causative error;

evaluating the stored error state pattern by the coordination module;

for said evaluation, said coordination module comparing the stored temporally successive error state pattern comprising said error states and the respective time points caused by said single causative error with predetermined error state patterns, each of said predetermined error state patterns defining a temporal sequence of error states at respective time points of a predetermined single error type, and determining at least one error type identifying said single causative error; and implementing a corrective action by the coordination module dependent on the error type.

2. A method of claim 1 wherein said corrective action comprises providing at least one corrective measure to the printer or copier.

3. A method of claim 1 wherein said corrective action comprises providing an error message.

4. A method of claim 2 wherein a plurality of corrective measures are provided by the coordination module dependent on the error type.

5. A method of claim 1 wherein said corrective action comprises providing both at least one corrective measure and at least one error message by the coordination module dependent on the error type.

6. A method of claim 1 wherein the coordination module is connected with a host system, whereby the coordination module only registers with the host system causative errors that cannot be corrected automatically.

7. A method of claim 1 wherein information about the respective error type of temporally successive error states that can be automatically remedied are stored at least in one error storage of the coordination module.

8. A method of claim 1 wherein temporally successive error states transmitted up to a shut down of the printer or copier are evaluated with aid of a predetermined error evaluation algorithm.

9. A method of claim 1 wherein dependent on the error type, the printer or copier is at least one of automatically restarted, an automatic start is prevented, and a signaling of the error to a subordinate controller occurs.

10. A method of claim 1 wherein the printing or copying event is ended after the transmission of the temporally successive error states, and all of the error states transmitted up to the ending of the printer or copier copying event are stored in the storage and used for the evaluation.

11. A method of claim 1 wherein the stored temporally successive error states are erased in the storage after the evaluation of the temporally successive error states.

12. A device for error handling in a printer or copier, comprising:

a plurality of separate monitoring units each located in a different device component of the printer or copier, each monitoring unit detecting a respective error state at a respective time point represented by a respective error signal from said respective monitoring unit of the printer or copier created by a single causative error;

a coordination module which receives the detected error states and the respective time points transmitted to the coordination module by the separate monitoring units;

a storage associated with said coordination module in which are stored said received error states and the respective time points where combined they form a temporally successive error state pattern comprising said error states and the respective time points caused by said single causative error;

said coordination module evaluating the stored error state pattern by comparing the stored error state pattern comprising said error states and the respective time points caused by said single causative error with predetermined error state patterns, each of said predetermined error state patterns defining a temporal sequence of error states of a predetermined single error type, and determining at least one error type identifying said causative error; and said coordination module implementing a corrective action dependent on the error type.

\* \* \* \* \*